(No Model.)

H. A. MOYER.
SPRING VEHICLE.

No. 410,847. Patented Sept. 10, 1889.

WITNESSES:
C. L. Bendixon
H. M. Seamans

INVENTOR
Harvey A. Moyer
BY
Duell, Laass & Duell
ATTORNEYS

UNITED STATES PATENT OFFICE.

HARVEY A. MOYER, OF SYRACUSE, NEW YORK.

SPRING-VEHICLE.

SPECIFICATION forming part of Letters Patent No. 410,847, dated September 10, 1889.

Application filed December 5, 1888. Serial No. 292,704. (No model.)

*To all whom it may concern:*

Be it known that I, HARVEY A. MOYER, of Syracuse, in the county of Onondaga, in the State of New York, have invented new and useful Improvements in Spring-Vehicles, of which the following, taken in connection with the accompanying drawings, is a full, clear, and exact description.

This invention relates to the class of vehicles which have cross-springs arranged over the axles in the same vertical planes therewith and hung on the axles.

The invention consists, first, in an improved construction of the axle, permitting of the use of a longer spring, reducing the cost of the manufacture of the axle, and imparting increased stability to the axle; secondly, in a novel attachment of the reach-braces to said axle and hanging the cross-spring on the attachment of said reach-braces, and, thirdly, in a novel attachment of the shaft-shackles to the axle and hanging the cross-spring on the attaching-shanks of said shackles, whereby the usual clips for the aforesaid attachments to the axles are dispensed with, all as hereinafter more fully described, and specifically set forth in the claims.

Figure 1:
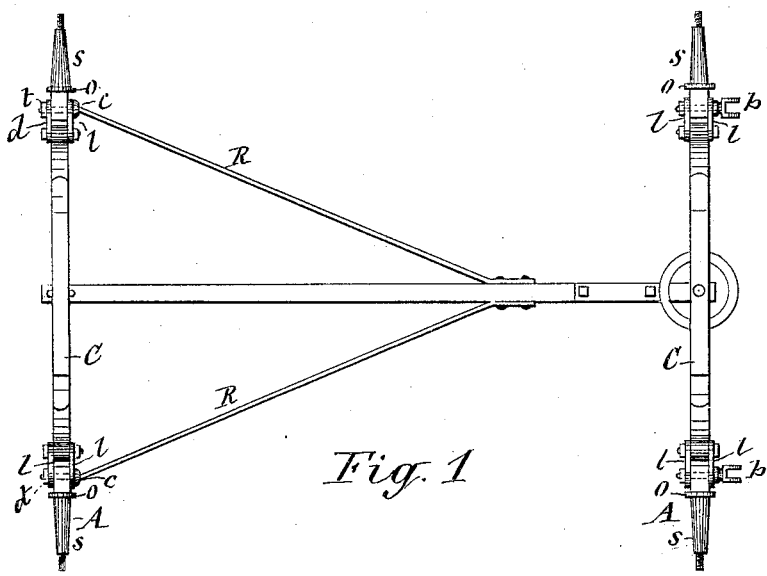
Figure 2:
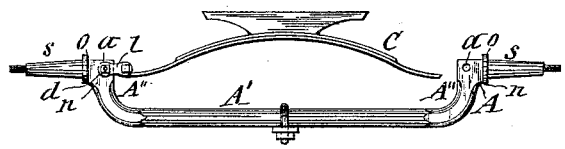
Figure 3:
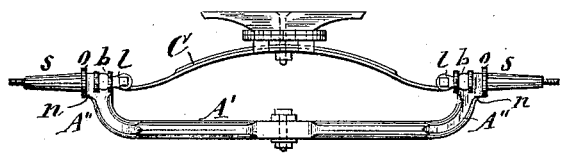
Figures 4, 5, 6, 7:
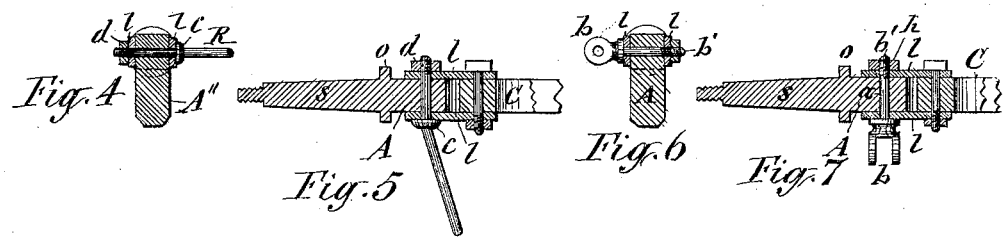

In the accompanying drawings, Figure 1 is a plan view of a vehicle embodying my improvements, the body and wheels being removed to better illustrate the essential features of the invention. Fig. 2 is a rear end view of said vehicle, one end of the spring being broken away to better illustrate the shape of the axle. Fig. 3 is a front end view of the same. Figs. 4 and 5 are enlarged vertical and horizontal sections of that portion of the rear axle to which one of the reach-braces is attached, and Figs. 6 and 7 are enlarged vertical and horizontal sections of that portion of the forward axle to which one of the shaft-shackles is attached.

Similar letters of reference indicate corresponding parts.

A A represent the forward and hind axles of the vehicle. Each of said axles is formed with the right-angled downward offsets A'' A'' in proximity to the spindles s s, and with the depressed central portion A', and C denotes the cross-spring hung on the axle and arranged over the same in the same vertical plane therewith and supporting the body of the vehicle. In order to permit of the use of as long a spring as possible, and at the same time bring the load to bear on the axle as near as possible to the spindles s s, I make the offsets A'' A'' directly at the inner ends of the spindles, leaving barely sufficient metal to permit the perforations a a to be made horizontal transversely through the end portions A''' A''' of the axle, between the inner faces of the offsets A'' A'' and spindles s s, and to compensate for any weakening of the axle incident to the said perforations I re-enforce the axle by enlargements n n, extending from the outer faces of the offsets A'' A'' to the collars o o on the axle at the inner ends of the spindles.

In order to dispense with the extra coupling-bolts for hanging the spring-coupling links l l on the perforated end portions of the axle, and also dispense with the usual clips for fastening the reach-braces R R on the hind axle, (which clips are, in fact, almost inadmissible on an axle formed with the short end portions A'' A'',) I extend the rear ends of the reach-braces through the perforations a of the hind axle and provide each of said reach-braces with a collar c at the front of the axle and with a head or nut d at the rear of the axle. Said end projects sufficiently from the axle to allow a link l to be hung on said reach-brace between the head or nut and rear of the axle, and another similar link l is hung on the reach-brace in front of the axle, the cross-spring C being coupled at its end between the aforesaid links in the usual manner.

The forward axle is formed substantially like the hind axle, and in order to also dispense with the usual clips for attaching the shaft-shackles b b to the forward axle and the extra bolts for coupling the spring-hanging links l l on the axle, I form the shaft-shackles b b each with a bolt or an attaching-shank b', which extends through one of the perforations a of the axle, and is of sufficient length to permit the links l l to be hung on said shank at opposite sides of the axle. The rear end of the shank b' is screw-threaded and provided with a nut h. The forward cross-spring C is also arranged over the forward axle in the same vertical plane therewith, and is provided at its ends with the usual eyes, which enter between the links $l\,l$, and are coupled thereto by bolts passing through the same.

Having described my invention, what I claim as new, and desire to secure by Letters Patent, is—

1. The combination of the axle formed with horizontal transverse perforations, reach-brace attachments extending through said perforations, and a cross-spring hung on said attachments, substantially as specified and shown.

2. The combination of the axle formed with the downward offsets $A''\,A''$ and with the perforations $a\,a$ between the inner faces of said offsets and spindles of the axle, the reach-braces R R, extending through the said perforations, the cross-spring C in the same vertical plane with the axle, and links $l\,l$, connecting the cross-spring with the reach-braces at opposite sides of the axle, substantially as described and shown.

3. The combination of the axle formed with horizontal transverse perforations and shaft-shackles provided with attaching bolts or shanks extending through the said perforations, as set forth.

4. The combination of the axle formed with horizontal transverse perforations, shaft-shackles provided with attaching-shanks extending through said perforations, and a cross-spring over the axle in the same vertical plane therewith and hung on the attaching-shanks of the shaft-shackles, as set forth.

5. The combination of the axle formed with the downward offsets $A''\,A''$ and with the perforations $a\,a$ between the inner faces of said offsets and spindles of the axle, the shaft-shackles $b\,b$, formed with the attaching-shanks $b'$, extending through the perforations $a\,a$, the cross-spring in the same vertical plane with the axle, and links $l\,l$, connecting said spring with the shanks $b'$, substantially as described and shown.

In testimony whereof I have hereunto signed my name, in the presence of two witnesses, at Syracuse, in the county of Onondaga, in the State of New York, this 3d day of December, 1888.

HARVEY A. MOYER. [L. S.]

Witnesses:
C. H. DUELL,
MARK W. DEWEY.